(12) United States Patent
Vinogradov et al.

(10) Patent No.: US 7,571,854 B2
(45) Date of Patent: Aug. 11, 2009

(54) IMAGING READER AND METHOD WITH INTERNAL WINDOW REFLECTIONS DIRECTED AWAY FROM IMAGER

(75) Inventors: Igor Vinogradov, Bay Shore, NY (US); Edward Barkan, Miller Place, NY (US); Mark Dryzmala, Commack, NY (US)

(73) Assignee: Symbol Technologies Inc., Holtsville, NY (US)

( * ) Notice: Subject to any disclaimer, the term of this patent is extended or adjusted under 35 U.S.C. 154(b) by 527 days.

(21) Appl. No.: 11/359,827

(22) Filed: Feb. 22, 2006

(65) Prior Publication Data

US 2007/0194119 A1 Aug. 23, 2007

(51) Int. Cl.
*G06K 7/10* (2006.01)
(52) U.S. Cl. ............. 235/454; 235/462.01; 235/462.45; 235/472.01
(58) Field of Classification Search .................. 235/454, 235/462.01, 462.11, 462.25, 462.45, 472.01
See application file for complete search history.

(56) References Cited

U.S. PATENT DOCUMENTS

| | | | | |
|---|---|---|---|---|
| 5,581,068 A | * | 12/1996 | Shepard et al. | 235/462.2 |
| 5,585,615 A | * | 12/1996 | Iwanami et al. | 235/462.06 |
| 5,750,976 A | * | 5/1998 | Eastman et al. | 235/462.36 |
| 5,812,581 A | * | 9/1998 | Cox | 372/50.21 |
| 6,105,869 A | * | 8/2000 | Scharf et al. | 235/454 |
| 6,385,352 B1 | * | 5/2002 | Roustaei | 382/324 |
| 7,065,299 B2 | * | 6/2006 | Schluter et al. | 398/135 |
| 7,204,424 B2 | * | 4/2007 | Yavid et al. | 235/462.32 |
| 2003/0002547 A1 | * | 1/2003 | Lee | 372/29.02 |

* cited by examiner

*Primary Examiner*—Thien Minh Le
*Assistant Examiner*—April A Taylor

(57) ABSTRACT

A target is illuminated with illumination light for image capture by a solid-state imager of an imaging reader. Internal reflections of the illumination light at a window are minimized, if not eliminated, by configuring the window as a non-planar optical element operative for redirecting the internal reflections away from the imager to enhance reader performance.

15 Claims, 3 Drawing Sheets

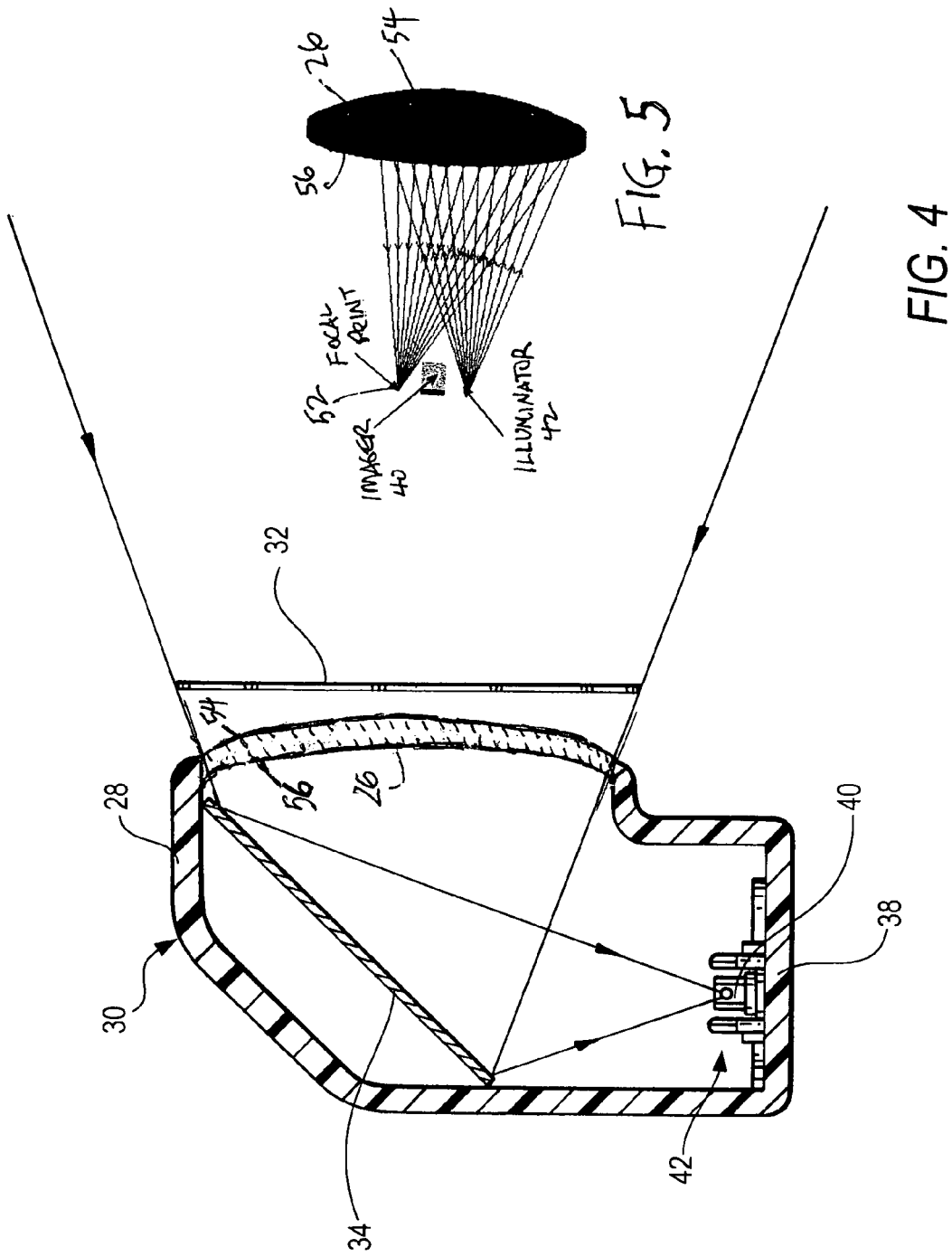

IMAGING READER AND METHOD WITH INTERNAL WINDOW REFLECTIONS DIRECTED AWAY FROM IMAGER

BACKGROUND OF THE INVENTION

1. Field of the Invention

The present invention generally relates to an electro-optical reader for reading a target, especially one- and two-dimensional symbols, by using a solid-state imager for image capture and a target illuminator for directing illumination light to and through a window on the reader and, more particularly, to configuring the window to redirect the illumination light incident thereon from the illuminator and reflected from the window away from the imager to enhance reader performance.

2. Description of the Related Art

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539; and 5,200,599, a single, horizontal, planar window is set flush with, and built into, a horizontal countertop of the workstation. Products to be purchased bear an identifying symbol and are typically slid or swiped across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

Instead of, or in addition to, a horizontal slot scanner, it is known to provide a vertical slot scanner, which is typically a portable reader placed on the countertop such that its planar window is generally vertical and faces an operator at the workstation. The generally vertical window is oriented perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and recently used for processing two-dimensional symbols, such as Code 49, as well. Code 49 introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786. Such two-dimensional symbols are generally read by electro-optical readers operative for projecting a laser beam as a raster of scan lines, each line extending in one direction over a respective row, and all the lines being spaced apart along a height of the two-dimensional symbol in a generally perpendicular direction.

Both one- and two-dimensional symbols can also be read by employing solid-state imagers. For example, an image sensor device may be employed which has a one- or two-dimensional array of cells or photosensors, which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information over a field of view. In addition to the aforementioned symbols, scanners employing image sensor devices can also read general two-dimensional symbols, such as DataMatrix, which cannot be read by existing laser-based scanners.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to integrate an illuminator with the reader, especially when the symbol is to be read under dim or dark ambient light. The illuminator may be externally mounted on, or internally mounted in, a housing of the reader. With an internal illuminator, the illumination light generated by the illuminator within the housing is directed to and through the window to the symbol.

Although generally satisfactory for its intended purpose, the use of an internal illuminator is disadvantageous. A portion of the illumination light incident on the window is reflected therefrom into the housing away from the window and reaches the imager. This reflected portion of the illumination light creates undesirable hot spots in the captured image of the symbol and may significantly compromise automatic exposure settings and reader performance.

The art has proposed to eliminate such hot spots by various means. For example, the externally mounted illuminator, as mentioned above, does not produce any reflections inside the housing. However, the externally mounted illuminator is subject to breakage, especially if dropped or roughly handled, and is exposed to environmental hazards such as dust and like contaminants. Also, the externally mounted illuminator is not located on the optical axis of the imager, thereby causing a parallax effect and non-uniform illumination at both near and far working distances from the reader. In addition, when a target is placed very close to an imaging reader having an externally mounted illuminator, the center of the target is not well illuminated, if at all. The external illumination will be positioned in a ring around the periphery of the window. The center of the target will, at best, be more dimly illuminated than the outer region of the target at the periphery.

Another technique for eliminating such hot spots resides in positioning the window in close proximity to the imager so that the reflected portion of the illumination light cannot reach the imager. However, this technique limits the location of the window and constrains the overall design of the housing.

In the art of laser scanners in which a laser within a housing directs a laser beam to and through a planar window to a symbol for reflection therefrom to a photodetector within the housing, it is also known to tilt the window to prevent the laser beam incident on the window from reflecting back to the photodetector and compromising the detection and successful reading of the symbol. However, tilting the window, although acceptable in some applications, is not altogether desirable in other applications, for example, for an imaging reader, because the tilt angle required would be large, i.e., on the order of 45 degrees, which may be too large and difficult to implement in certain imaging readers and overly constrain the industrial design of the reader.

SUMMARY OF THE INVENTION

Objects of the Invention

Accordingly, it is a general object of this invention is to advance the state of the art of electro-optical readers that operate by image capture.

Another object of this invention is to reliably capture an image of a target without creating hot spots that degrade the captured image.

Still another object of the present invention is to enhance reader performance by minimizing, if not eliminating, internal reflections at the window from reaching the imager.

Yet another object of the present invention is to provide more flexibility and options for the industrial design of an imaging reader.

FEATURES OF THE INVENTION

In keeping with the above objects and others, which will become apparent hereinafter, one feature of the present invention resides, briefly stated, in a reader for, and a method of, electro-optically reading a target, especially one-dimensional symbols, two-dimensional symbols, or documents. The reader is preferably embodied as a portable point-of-transaction workstation having a window supported by a housing, but could be embodied as a handheld housing having a window. During reading, the target is swiped past the window during a swipe mode, or the window is swept past the target, or the target is presented to the reader during a presentation mode. In the preferred embodiment, the workstation is installed in a retail establishment, such as a supermarket, but can be installed virtually anywhere requiring targets to be read.

A two-dimensional, solid-state imager under control of a controller is mounted in the reader, and includes a two-dimensional array of image sensors arranged in mutually orthogonal rows and columns, and operative for capturing light from a one-dimensional and/or a two-dimensional symbol and/or a document or like target through the window over a field of view during the reading. Preferably, the array is a CCD array, but could be a CMOS array. The imager is associated with an illuminator, also under control of the controller and mounted in the reader, to enable the image of the target to be acquired in a very short period of time, for example, on the order of 500 microseconds, so that the target image is not blurred even if there is relative motion between the imager and the target. The illuminator directs illumination light to and through the window to illuminate the target during reading. The illumination is preferably brighter than ambient illumination, especially close to the window. The brighter the illumination, the faster is the reading speed. The illumination can also be continuous. The imager captures light over an exposure time period, also under control of the controller. A short exposure time also prevents image blurring. The shorter the exposure time period, the less blurring of the image occurs.

As noted above, a portion of the illumination light incident on the window is reflected therefrom into the housing away from the window. If this reflected portion of the illumination light were to reach the imager, then the imager's performance would be degraded because hot spots would be formed on the captured target image.

In accordance with this invention, the window is configured as a non-planar optical element for redirecting the reflected portion of the illumination light away from the imager. Preferably, the optical element is curved, and is constituted of light-transmissive plastic or glass, and has a radius of curvature with outer and inner spherical surfaces. The curved optical element collects and focuses the reflected portion of the illumination light to a focal point spaced from the imager. In the preferred embodiment, the illuminator is spaced from the window by a distance about equal to the radius of curvature of the curved optical element. Also, the curved optical element has an optical power, which is preferably zero, or nearly zero, so as not to adversely affect the image capture of the target by the imager.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a schematic block diagram of various components of an imaging reader used in the workstation of FIG. 1 in accordance with the present invention; and FIG. 5 is a schematic representation of some of the components of FIG. 4 depicting the redirection of internal reflections at the window away from the imager in the reader.

DETAILED DESCRIPTION OF THE PREFERRED EMBODIMENTS

Figure 1:
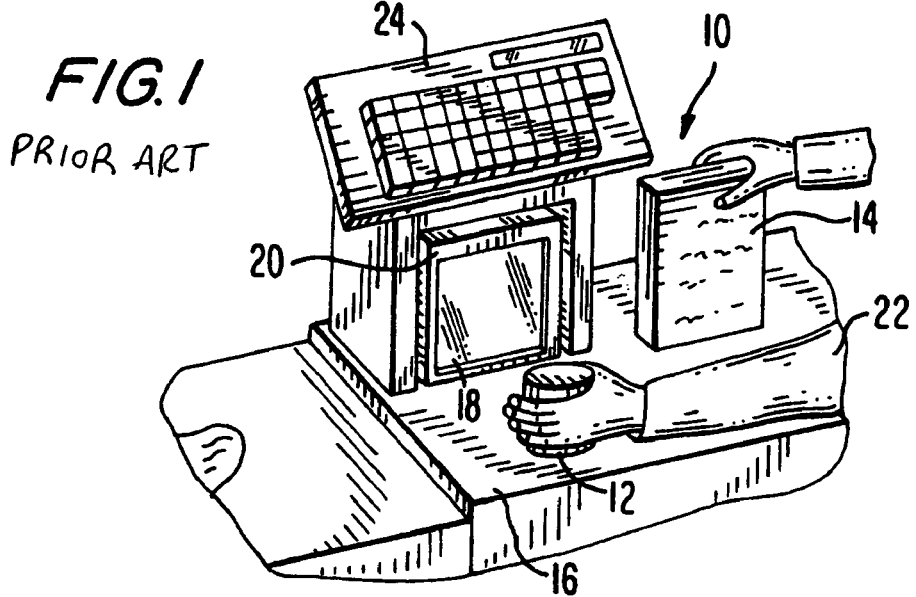
FIG. 1 is a perspective view of a point-of-transaction workstation operative for capturing light from targets in accordance with the prior art.

Reference numeral 10 in FIG. 1 generally identifies a workstation in accordance with the prior art for processing transactions and specifically a checkout counter at a retail site at which products, such as a can 12 or a box 14, each bearing a target symbol, are processed for purchase. The counter includes a countertop 16 across which the products are slid at a swipe speed past a vertical planar window 18 of a box-shaped housing of a vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
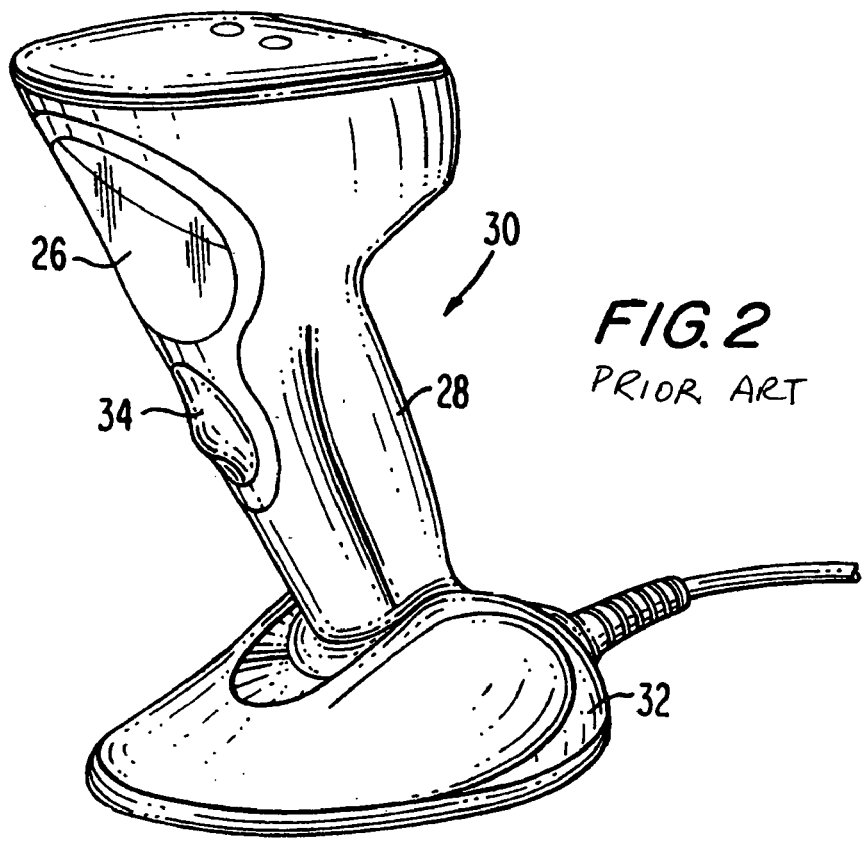
FIG. 2 is a perspective view of an electro-optical reader operative in either a hand-held mode, or a workstation mode, for capturing light from targets in accordance with the prior art.

Reference numeral 30 in FIG. 2 generally identifies another reader having a different configuration from that of reader 20. Reader 30 also has a generally vertical planar window 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

Figure 3:
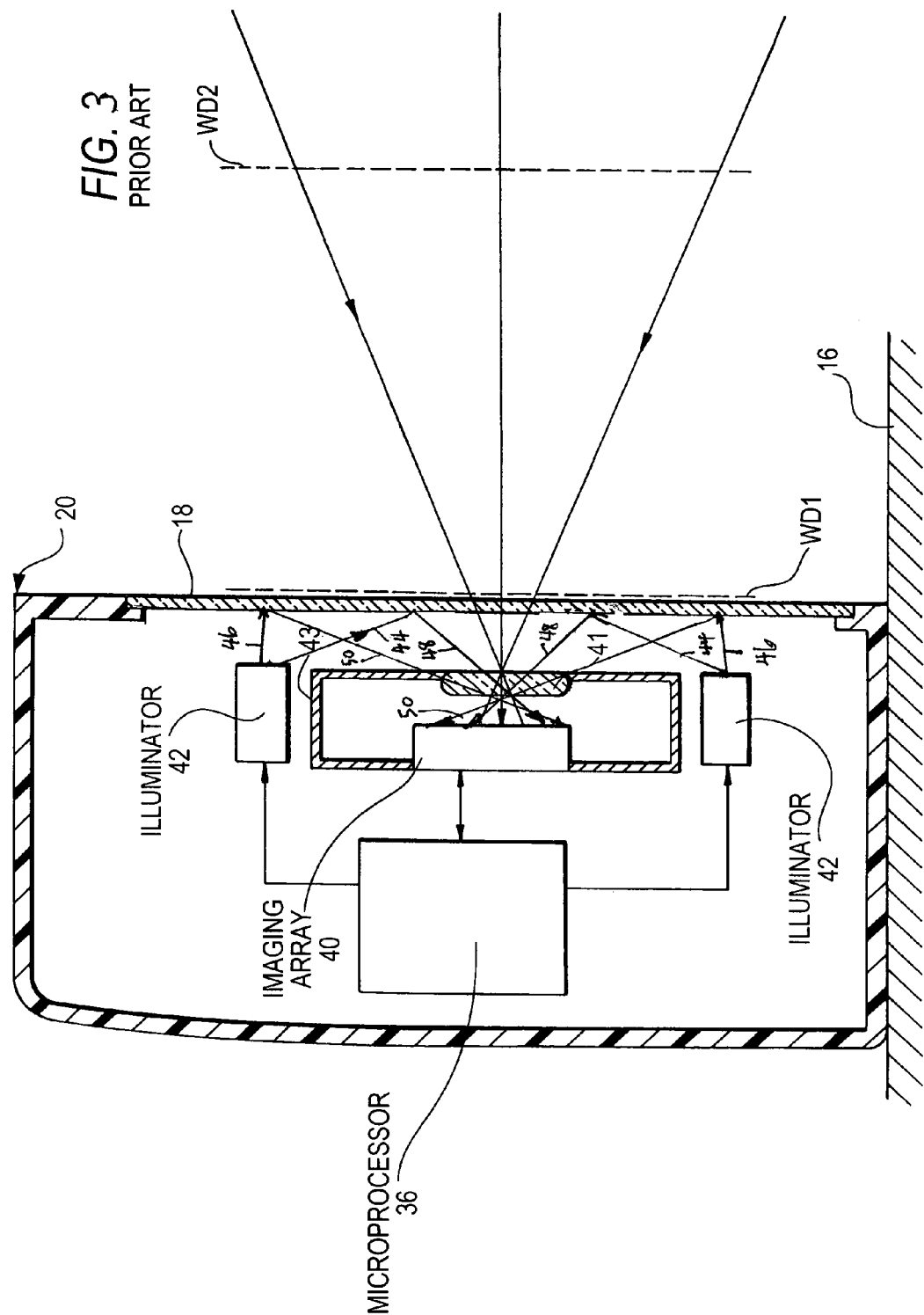
FIG. 3 is a schematic block diagram of various components of an imaging reader used in the workstation of FIG. 1 in accordance with the prior art.

As described so far, the readers 20, 30 are conventional. As shown in FIG. 3, in further accordance with the prior art, the vertical slot scanner generally includes an imager having an imaging array 40 and an imaging lens 41 mounted in an enclosure 43. The array 40 is a solid-state device, for example, a CCD or a CMOS imager and has a plurality of addressable image sensors arranged in mutually orthogonal rows and columns, and operative for capturing target light through the window 18 from a target over a field of view and located in a working range of distances between a close-in working distance (WD1) and a far-out working distance (WD2). Typically, WD1 is about two inches from the imaging array 40 and generally coincides with the window 18, and WD2 is about eight inches from the window 18. An illuminator 42 is also mounted in the reader and preferably includes a plurality of light sources, e.g., light emitting diodes (LEDs) arranged around the array 40 to uniformly illuminate the target, especially under dim or dark ambient lighting conditions.

As also shown in FIG. 3, the array 40 and the illuminator 42 are operatively connected to a controller or microprocessor 36 operative for controlling the operation of these components. Preferably, the microprocessor is the same as the one used for decoding light scattered from the target and for processing the captured target images.

In operation, the microprocessor 36 sends a command signal to the illuminator 42 to pulse the LEDs for a short time period of 500 microseconds or less, and energizes the array 40 to collect light from a target substantially only during said time period. A typical array needs about 33 milliseconds to read the entire target image and operates at a frame rate of about 30 frames per second. The array may have on the order of one million addressable image sensors.

As also shown in FIG. 3, the illuminator 42 directs illumination light 44, 46 to and through the window 18 to illuminate the target at WD1 or WD2, or anywhere in between these working distances, during reading. A portion 48, 50 of the illumination light incident on the window 18 is reflected therefrom inwardly into the housing away from the window. If this reflected portion 48, 50 of the illumination light were to reach the imager, i.e., the array 40 and/or the imaging lens 41, then the imager's performance would be degraded because hot spots, as described above, would be formed on the captured target image.

As shown in FIG. 4, the solid-state array 40 is mounted within a housing 28 of a reader 30 in which a window 26 is supported to capture light from a target 32, e.g., a one-dimensional symbol, a two-dimensional symbol, a document, a person, etc. over a field of view. The housing has a base 38 on which the array 40 is supported, together with the illuminator 42. The array 40 faces upwardly toward a folding mirror 34 operative for reflecting the captured light to the array 40, as well as for reflecting the illumination from the illuminator 42 to the target. Positioning the illuminator 42 deep within the housing enables a more uniform illumination of the target, especially up close to the window 26, and also minimizes the parallax effect between the illuminator and the imager. The entire surface of the target is illuminated regardless of the distance between the target and the window. The folding mirror 34 allows the front-to-back dimension of the housing 28 to be reduced. This minimizes the size of the reader footprint, which is often important in crowded work environments such a retail point-of-sale workstation.

In accordance with this invention, the window 26 is configured as a non-planar optical element, i.e., an element capable of collecting light, for redirecting the reflected portion 48, 50 of the illumination light away from the imager. Preferably, the optical element is curved, is constituted of light-transmissive plastic or glass, colored or non-colored, and has a radius of curvature with outer 54 and inner 56 spherical surfaces. As best seen in FIG. 5, the curved optical element collects and focuses the reflected portion 48, 50 of the illumination light to a focal point 52 spaced from the imager or to a plurality of spots around the focal point 52. In the preferred embodiment, the illuminator 42 is spaced from the window 26 by a distance about equal to the radius of curvature of the curved optical element. Also, the optical power of the curved optical element is preferably zero, or nearly zero, so as not to adversely affect the image capture of the target. This can be achieved by maintaining the thickness of the optical element between the outer and inner spherical surfaces relatively small and uniform.

It will be understood that each of the elements described above, or two or more together, also may find a useful application in other types of constructions differing from the types described above. Thus, readers having different configurations can be used.

While the invention has been illustrated and described as minimizing internal reflections of illumination light at a window of an imaging reader, it is not intended to be limited to the details shown, since various modifications and structural changes may be made without departing in any way from the spirit of the present invention.

For example, the curved optical element need not necessarily be spherical, but could be aspherical or cylindrical. Some asphericity can be introduced to enhance the performance of the imaging lens 41.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading a target, comprising:
    a) a housing having a window; and
    b) a solid-state imager in the housing and including an array of image sensors for capturing target light through the window from the target over a field of view;
    c) an illuminator in the housing for directing illumination light to and through the window to illuminate the target during reading, a portion of the illumination light incident on the window being reflected therefrom into the housing away from the window; and
    d) the window being configured as a non-planar, curved optical element for collecting, redirecting and focusing the reflected portion of the illumination light to a focal point spaced away from the imager to enhance reader performance.

2. The reader of claim 1, wherein the curved optical element has a radius of curvature.

3. The reader of claim 2, wherein the curved optical element has outer and inner spherical surfaces.

4. The reader of claim 2, wherein the illuminator is spaced from the window by a distance about equal to the radius of curvature of the curved optical element.

5. The reader of claim 2, wherein the curved optical element has an optical power of about zero.

6. The reader of claim 1, wherein the imager captures the target light over an exposure time period, and a controller for controlling at least one of the exposure time period and the illumination light.

7. The reader of claim 1, wherein the illuminator includes a plurality of light emitting diodes (LEDs).

8. The reader of claim 1, wherein the target is at least one selected from a group including a one-dimensional symbol, a two-dimensional symbol, and a document.

9. The reader of claim 1, wherein the imager is one of a charge coupled device and a complementary metal oxide silicon device.

10. A method of electro-optically reading a target, comprising the steps of:
   a) mounting a window on a housing of an electro-optical reader;
   b) capturing target light with an array of image sensors of a solid-state imager through the window from the target over a field of view;
   c) illuminating the target during reading by directing illumination light to and through the window, a portion of the illumination light incident on the window being reflected therefrom into the housing away from the window; and
   d) configuring the window as a non-planar, curved optical element for collecting, redirecting and focusing the reflected portion of the illumination light to a focal point spaced away from the imager to enhance reader performance.

11. The method of claim 10, wherein the configuring step is performed by forming the curved optical element with a radius of curvature.

12. The method of claim 11, wherein the configuring step is performed by forming the curved optical element with outer and inner spherical surfaces.

13. The method of claim 11, and the step of spacing the illuminator from the window by a distance about equal to the radius of curvature of the curved optical element.

14. The method of claim 11, wherein the configuring step is performed by forming the curved optical element with an optical power of about zero.

15. The method of claim 10, and the step of selecting the target from a group including a one-dimensional symbol, a two-dimensional symbol, and a document.

* * * * *

UNITED STATES PATENT AND TRADEMARK OFFICE
CERTIFICATE OF CORRECTION

| | | |
|---|---|---|
| PATENT NO. | : 7,571,854 B2 | Page 1 of 1 |
| APPLICATION NO. | : 11/359827 | |
| DATED | : August 11, 2009 | |
| INVENTOR(S) | : Igor Vinogradov, Edward Barkan and Mark Drzymala | |

It is certified that error appears in the above-identified patent and that said Letters Patent is hereby corrected as shown below:

On the Title Page Item (75)
Spelling of the third inventor's last name should be "Drzymala" and not "Dryzmala"

Signed and Sealed this

Eighth Day of February, 2011

David J. Kappos
*Director of the United States Patent and Trademark Office*